(12) United States Patent
Colella

(10) Patent No.: US 7,949,609 B2
(45) Date of Patent: May 24, 2011

(54) SYSTEM FOR SECURE ONLINE SELLING, BUYING AND BILL PAY IN AN ELECTRONIC COMMERCE SETTING

(76) Inventor: Brian Colella, Shady Side, MD (US)

( * ) Notice: Subject to any disclaimer, the term of this patent is extended or adjusted under 35 U.S.C. 154(b) by 1182 days.

(21) Appl. No.: 11/646,121

(22) Filed: Dec. 27, 2006

(65) Prior Publication Data

US 2007/0174206 A1    Jul. 26, 2007

Related U.S. Application Data

(60) Provisional application No. 60/757,181, filed on Jan. 6, 2006.

(51) Int. Cl.
*G06Q 20/00* (2006.01)
*G06K 5/00* (2006.01)

(52) U.S. Cl. .......................... 705/64; 235/380
(58) Field of Classification Search ............... 705/50–69
See application file for complete search history.

(56) References Cited

U.S. PATENT DOCUMENTS

| | | | | |
|---|---|---|---|---|
| 5,764,789 A * | 6/1998 | Pare et al. | ...................... | 382/115 |
| 6,464,367 B2 * | 10/2002 | Ito et al. | ...................... | 362/613 |
| 6,494,367 B1 * | 12/2002 | Zacharias | ...................... | 235/382 |
| 7,325,724 B2 * | 2/2008 | Bonalle et al. | ................. | 235/380 |
| 2004/0050930 A1 * | 3/2004 | Rowe | ............................ | 235/380 |
| 2006/0180674 A1 * | 8/2006 | Margalit et al. | ............... | 235/492 |
| 2007/0131759 A1 * | 6/2007 | Cox et al. | ...................... | 235/380 |

* cited by examiner

*Primary Examiner* — Calvin L Hewitt, II
*Assistant Examiner* — Zeshan Qayyum
(74) *Attorney, Agent, or Firm* — Ober/ Kaler; Royal W. Craig

(57) ABSTRACT

A method and system for biometric-secure online selling, buying and bill paying in electronic commerce and retail point-of-sale settings that also simplifies the checkout process and eliminates fraudulent transactions. The system relies on an exchange service provider (ESP) that hosts multiple servers: one implementing a web portal for secure online banking, auctions and other exchange opportunities, another being a biometric fingerprint device authenticating database, and yet another being a transaction traffic manager. Participating banks and supporting institutions distribute and activate Secure Individual Identity Devices (SIIDs) to registered users, each SIID being a portable biometric activated identification device that locally stores a fraction of the enrolled users fingerprint (minutia) along with an encrypted code that is used to verify and authenticate the user, eliminating the use of personal or financial information for this purpose. The SiiD becomes the user's own personal key for completing secure online transactions. The user simply plugs their SiiD into any USB-equipped device and scans their own fingerprint for each transaction. The encrypted codes are authenticated in the ESP database and the transaction is processed to the appropriate financial institutions.

1 Claim, 3 Drawing Sheets

SYSTEM FOR SECURE ONLINE SELLING, BUYING AND BILL PAY IN AN ELECTRONIC COMMERCE SETTING

CROSS-REFERENCE TO RELATED APPLICATION(S)

The present application derives priority from U.S. Provisional Application No. 60/757,181 filed Jan. 6, 2006.

BACKGROUND OF THE INVENTION

1. Field of the Invention

The present invention relates to the credit and debit purchase approval process and, more particularly, to a system for biometric-secure online buying, selling and bill paying in electronic commerce and retail point-of-sale setting to simplify checkout and to eliminate fraudulent credit transactions.

2. Description of the Background

Credit accounts are convenient and widely used, but they are acutely susceptible to theft. Within minutes, thieves can purchase thousands of dollars worth of merchandise, and the unsuspecting consumer eventually pays one way or another. Indeed, the net Credit/Debit Card Fraud in the United States grew from about $637.32 M in 1990 to an estimated $1.35 B in 2002 according to the Nilson report. When a cardholder denies that he or she made a transaction, the amount is charged back to the merchant, who then does not get paid for the transaction. For example, in March 2000, Expedia.com reported a $4 to $6 million (US$) third quarter loss to cover fraudulent credit card purchases made on its Web site.

The numbers continue to grow and this continues to reflect poorly on the credit industry. Consumers hesitate to shop online and some still refuse to use a credit card due to their perception of utter insecurity. Consequently, many credit companies are investing in technologies to help make credit purchases more secure. Some credit cards now display a photograph of the cardholder so criminals can't make face-to-face purchases with a stolen credit card. Many cards have holograms, secret imprints, or hidden images so thieves have a harder time making a new credit card with a stolen credit card number. Credit card companies are also pressuring merchants to be more wary, and retailers are trying new security measures. On the other hand, over-zealous security measures wind up costing sales too. Security usually increases the transaction time, and consumers do not like spending excessive time while more secure transactions re cleared. They also do not like registering their personal information in too many places due to identity theft. Consumers like a balance between security and convenience.

Biometric authentication is gaining popularity as a security measure, and especially fingerprints. For example, U.S. Pat. No. 6,950,810 to Lapsley et al. (Indivos Corporation) issued Sep. 27, 2005 shows a token less biometric electronic financial transactions method for authorization of an electronic payment between a payor and a payee using a third party provider. Users register with the third party and give a fingerprint, as well as their financial account information. The information is used during an online auction, and in each instance the bidder provides their fingerprint. Payee bid identification data and the payor fingerprint are electronically forwarded to the third party who successfully identifies the payor and payee. An electronic financial transaction is then formed between the payor and payee, comprising a transaction amount and a payor financial account identifier. This transaction is then electronically forwarded to a financial transaction processor for processing.

United States Patent Application 20040199469 by Barillova et al. published Oct. 7, 2004 shows a method and system for authentication of online commercial transactions between a customer and a merchant comprising the steps of registering a customer with a PIN and a biometric sample, and a customer financial account. Despite a broad disclosure, the claims are somewhat narrower, limited to issuing a temporary transaction code to each authenticated customer; and conducting a transaction with a merchant using said temporary transaction code.

U.S. Pat. No. 5,613,012 to Hoffman et al. (Smarttouch, LLC) issued Mar. 18, 1997, and related U.S. Pat. No. 6,269,348 to Pare, Jr. et al. (Veristar Corporation) issued Jul. 31, 2001 both show a tokenless identification system and method for authorization of transactions and transmissions. The system uses a comparison of a fingerprint gathered directly from an unknown user, with an authenticated biometrics sample of the same type obtained and stored previously.

U.S. Pat. No. 6,270,011 to Gottfried issued Aug. 7, 2001 shows a method for providing secure transactions with credit cards by adding a fingerprint scanner at the point-of-sale to obtain fingerprint data, so that a credit card company database can verify the fingerprint data against stored fingerprint information and verify the transaction accordingly. The method is integrated into the existing negotiation protocol between a point-of-sale system and a credit card company database, and uses a human fingerprint and a secure algorithm. The credit card company has the customer fingerprint for comparison on its existing database. In the case of an Internet purchase, an authorization adaptor is connected to the user PC, and once the user has made the purchase request, an encrypted communication is then commenced in which a token is sent by the credit card company to the user PC, requesting fingerprint data. The authorization adaptor provides the fingerprint scan, and sends the data to the user PC in encrypted form, for transfer to the credit card company by a secure communication, for authorization. The fingerprint scanner is based on use of a new sensor employing a technology that maps and matches fingerprints, using coincidence of the features (minutia) on as few as twelve similar points, to determine a match.

United States Patent Application 20050165700 by Karthik (Multimedia Glory) published Jul. 28, 2005 shows a security system for electronic commerce for verifying the authenticity of a user including: a server authentication program installed in a web-server at a website of a web-service provider; a client software component and fingerprint scanner installed at a workstation of the user. The scanner takes and converts a biometrics image into digital data, which is then compressed and encrypted, and transmitted to the web-server.

U.S. Pat. No. 6,944,773 to Abrahams issued Sep. 13, 2005 shows a method of on-line authentication in which a user presents one or more fingerprints for authentication during an on-line transaction, such as an Internet transaction. The host system indicates how many fingerprints will be requested for authentication, randomly selects which fingerprints will be requested, and sends a request for entry of the randomly selected fingerprints, and then compares the received fingerprint data to fingerprint data stored in a database.

U.S. Pat. No. 6,241,288 issued to Bergenek et al. in 2001 shows a fingerprint identification/verification algorithm that uses bitmaps of a stored fingerprint to correlate with a bit map of an input fingerprint, wherein an accurate reference point is located. This is followed by the selection of several two-dimensional areas in the vicinity of the reference point of the input image of the fingerprint. These areas are then correlated with stored fingerprint recognition information to determine if the input fingerprint image and the stored fingerprint recognition information are sufficiently similar to identify/verify the input fingerprint.

U.S. Pat. No. 4,229,023 to Luz issued Oct. 21, 1980 shows an identity check card with a fingerprint cut away in spots to provide alternate transparent zones and partial fingerprint zones. The placement of the card over a fresh fingerprint show immediately if the latter complements the former, thus permitting a quick and reliable check to be effected.

U.S. Pat. No. 5,869,822 to Meadows et al. issued Feb. 9, 1999 shows an automated fingerprint identification system. When a person applies for a credit card they must register a finger of their choice with the card issuance company. At the company, the finger is scanned and a composite number is produced that consists of several fingerprint-identifying parameters. The composite number is encoded onto the card and is stored in a card database. When a person wants to use the card, the card is inserted into a card reader and the person's finger is scanned by a fingerprint scanner, which produces a composite number. The immediate and stored composite numbers are compared and, when similar, use of the card is allowed.

U.S. Pat. No. 6,785,408 to Setlak et al. (Authentic, Inc) issued Aug. 31, 2004 shows a method for matching partial fingerprints using ridge flow.

United States Patent Application 20040044621 by Huang et al. (VISA) published Mar. 4, 2004 shows a payment system for facilitating a payment transaction between a payer and a payee using a separate payer access device, payee access device, and a services hub. Use of the access devices generates a tracer ticket. Upon receiving the copy of the tracer ticket, the payer uses the payer device to communicate with the services hub and forward the received copy of the tracer ticket to the services hub. The services hub then validates the payer device based on the access device information. Upon validation of the payer device, the services hub checks the copy of the tracer ticket forwarded by the access device against the previously generated tracer ticket. If the copy of the tracer ticket forwarded by the access device corresponds to the previously generated tracer ticket, the services hub authorizes the payment transaction against the payer account.

AuthenTec Inc. has announced the TruePrint™ fingerprint reader with incorporated Bluetooth transmitter. AuthenTec's press releases claim the company has 17 pending patents, but does not state the countries in which they are pending.

Internet Commerce Account Status Information (ICASI) sells a third party service that requires a biometric finger-scan to authorize use of a business bank account, credit card transaction, or online commerce. Once users have registered their fingerprints, they can conduct business with thousands of participating merchants. A window pops up asking users for authentication via the finger scanner. The scanner plugs into a USB port. The finger-scanner creates a "template" that is used to authenticate. A template can never be converted back to the original fingerprint. All fingerprint information is gathered using SSL encryption, then stored securely on computers not accessible from the outside. ICASI strives for privacy and will not sell or share information with any other company.

The TouchPass log-on security solution by NEC Technologies, Inc. offers finger-imaging technology to authenticate an individual's identity.

DigitalPersona, Inc. provides a complete fingerprint security system for PCs using USB fingerprint sensors. The plug-and-play USB fingerprint sensor is self-calibrating, and features auto and optimal image capture, latent image removal, a challenge-response link, and encrypted transmission of biometric information.

While the foregoing references all teach improved security through fingerprint biometrics, none pays attention to user-privacy refinements, or speed and convenience of each transaction.

SUMMARY OF THE INVENTION

Accordingly, it is an object of the present invention to assist merchants and consumers in protecting themselves against the dramatic increase in credit and banking fraud via biometric security, while also ensuring complete privacy of consumer's personal and financial data.

It is another object to provide a convenient method for biometric-secure online selling, buying, and bill paying in electronic commerce and retail point-of-sale setting to simplify checkout and allow a large number of eCommerce transactions.

It is another object to provide a flat transaction fee application service provider business model to facilitate biometric-secure online selling, buying and bill paying.

According to the present invention, the above-described and other objects are accomplished by providing an exchange service provider (ESP) network and to facilitate the credit and debit purchase approval process and, more particularly, a system for biometric-secure online selling, buying and bill paying in electronic commerce and retail point-of-sale setting to simplify checkout and to eliminate fraudulent credit transactions.

The ESP serves as a third-party authentication agent, authenticating each user-initiated transaction to supported banks and supporting institutions and collecting a small transaction fee in real time upon consummation of each transaction. The ESP also provides users with a web portal for secure online banking, auctions and other exchange opportunities. All users are required to preregister and this may be accomplished at participating banks, financial and other supporting institutions with user-accessible locations. The ESP distributes Secure Individual Identity Devices (SIIDs) having integrated fingerprint scanners to the participating banks and other supporting institutions, these institutions acting as a registration agent for the ESP. In order to register, each user simply pays a visit to a participating bank or other supporting institution, obtains a fingerprint scanner SIID, registers it at the participating bank or other supporting institution, then registers and activates their device. At registration, each user provides their bibliographic information and designates the financial accounts to be used for transactions, including routing data. At activation, each user completes an initial fingerprint scan on their personal SIID. The enrollment activation scans are digitized and a portion of the digital activation scan (the minutia) is memorized by the SIID device for instant comparison. This same portion of the scan is also encrypted into a passcode which is appended with a time-stamp, the entire time-stamped passcode being stored on the SIID. The encryption subdivides the minutia scan portion into sub-portions, and cyphers each sub-portion into an encrypted alphanumeric code, the codes for each sub-portion being merged into one divisible passcode. The SIID thus becomes the user's personal key for authenticating their online transactions. A divisible portion of the passcode (a "passkey", for example, one group, not the timestamp) is transmitted by secure (encrypted) transmission to a biometric device registrar (a separate databank server hosted by the ESP), where it is stored in a remote database for authenticating later transactions. In addition, the pass-key and the routing data for that user are sent from the registering bank or supporting institution to a traffic controller (also a separate server hosted by the ESP)

which serves as a transaction routing interface, routing each subsequent transaction to the bank or supported financial institution hosting the designated account to be used for that transaction. Neither the traffic controller, nor the biometric device registrar, nor the ESP as a whole possesses any account information or complete biometric information thereby preserving security and helping to ensure that the designated accounts cannot be compromised. In effect, the ESP only has the passkey (an encrypted part, of the passcode) and account routing data.

The ESP provider is networked through its traffic controller (via an encrypted network) to supported institutions including banks, credit card issuers, and private institutions, thus keeping fraudulent access to a minimum. Upon consummating an online transaction (after registration and enrollment activation), the user simply plugs their SIID into any USB port or supported card reader, and scans their own fingerprint. To proceed, the fingerprint data that the device obtains must correspond with the same section of the fingerprint data taken at enrollment activation. Thus, the SIID device compares the stored portion of the digital activation/enrollment scan with the corresponding portion of the instant fingerprint data. Given a match (authentication) the SIID device compiles the minutia from the live scan into the same passkey which is then transmitted through the ESP provider to the biometric device registrar where it is authenticated by comparison to the enrollment activation passkey. Given authentication, the user information and encrypted routing data for the transaction are transmitted to the traffic controller which handles routing of the transaction to the appropriate supporting institution. All data transmission is fully encrypted. Thus, the users own device gives instant authentication, and since only the encrypted passkey is ever transmitted (not fingerprint data or entire passcode) this system more fully protects the user's privacy.

The user-cost of the transaction includes the transaction amount, plus a minimal flat transaction fee reserved for the ESP. This is displayed to the user (for example, for a $100 transaction "do you agree to pay an ESP transaction fee of $0.50?" is displayed to user). If the user accepts, the designated financial institution hosting the selected user account consummates the transaction, debiting the user account by the transaction amount, plus the minimal flat transaction fee reserved for the ESP. The ESP collects their transaction fee right then in real time when transaction is done, the proceeds being transferred into an ESP account. The net result is an entirely secure transaction, and revenue to the ESP is allocated in real time inasmuch as the hosting financial institutions pay the ESP directly.

BRIEF DESCRIPTION OF THE DRAWINGS

Other objects, features, and advantages of the present invention will become more apparent from the following detailed description of the preferred embodiment and certain modifications thereof when taken together with the accompanying drawings in which.

DETAILED DESCRIPTION OF THE PREFERRED EMBODIMENTS

The present invention is a system, inclusive of an exchange service provider (ESP) topology and method for verifying personal ID and facilitating secure transactions using encrypted biometric information. The system employs a Secure Individual Identity Device (SIID) having an integrated biometric (fingerprint) scanner for enhanced authentication and security for any online credit or debit transaction (purchase, sale, banking, bill-paying, etc.) in electronic commerce, or retail point-of-sale setting.

The biometric SIID and the way that it is implemented in the larger context of the present system greatly enhances security and yet also simplifies the checkout process to eliminate fraudulent transactions.

The system also relies on a service provider that hosts an array of computer servers and implements a web portal for secure online authentications and other exchange opportunities. This system is in constant network communication with an independent database that provides authentication for the Secure Individual Identity Device.

Figure 1:
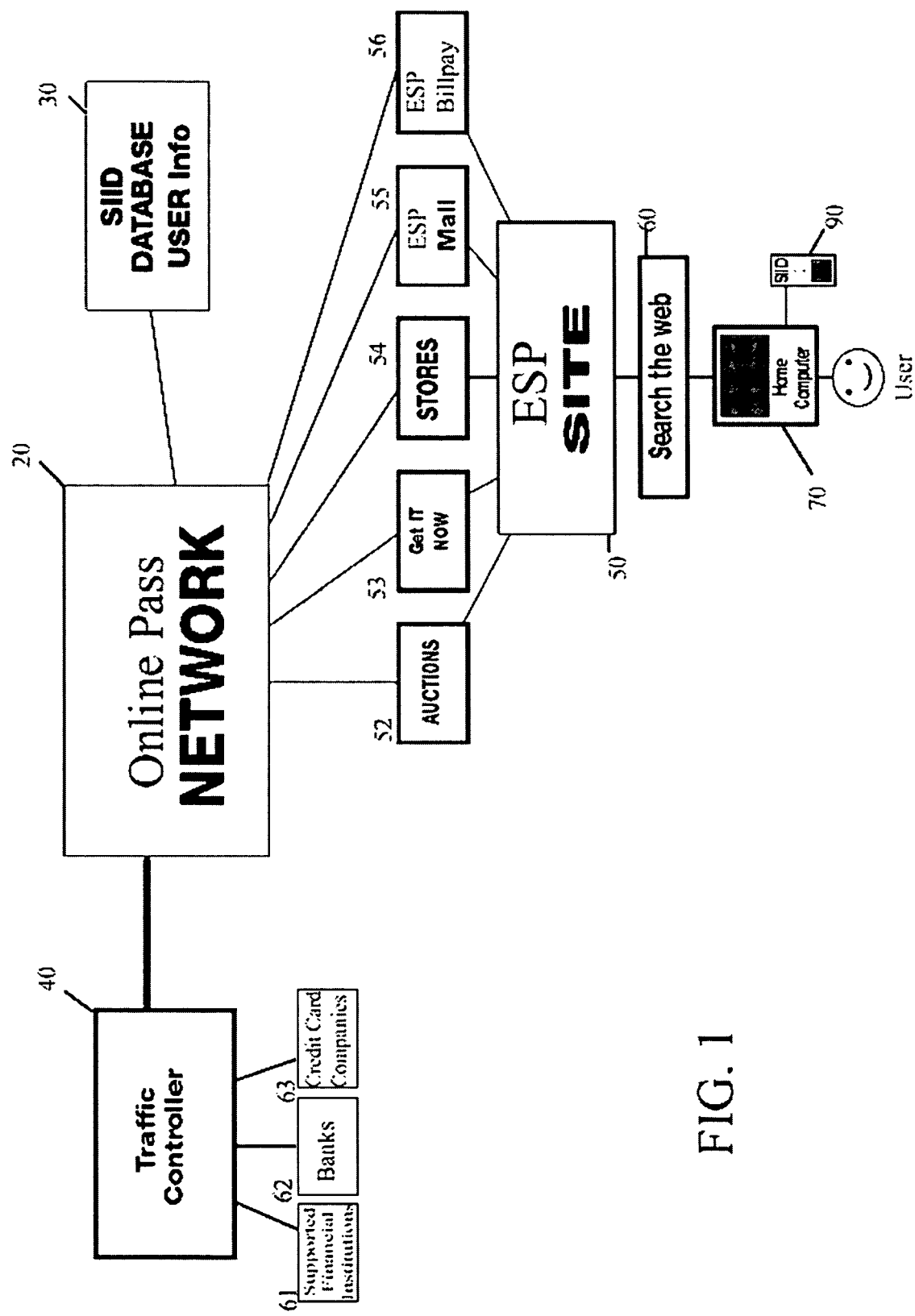
FIG. 1 is a top-level flow diagram illustrating the communication flow of the system for biometric-secure online buying and selling disclosed herein.

FIG. 1 is a block diagram illustrating a preferred embodiment of the present system for biometric-secure online buying, selling and bill paying. The system is maintained by an ESP which hosts a plurality (at least three) separate servers, one server being a secure online Online Pass Network 20 that provides users with an array of web portals 52-56 for peer-to-peer exchange and other transactional opportunities including but not limited to online auctions 52, services 53, banking 54, a virtual shopping mall 55, and an online bill payment function 56, among others. All of these web portals 52-56 are accessible to users from a central website 50 maintained by the ESP through their network 20. Thus, users having a computer 70 or any other capable device with a USB port may access the website 50 directly or through existing internet search engines 60.

Prior to actually consummating a transaction, users are required to preregister. This may be accomplished at any of the participating banks and other financial institutions 61-63 having user-accessible locations. The ESP distributes SIID fingerprint authentication devices to the participating banks and other financial institutions 61-63, and in order to register, each user simply pays a visit, obtains a SIID fingerprint scanner device, registers at the participating bank or other financial institutions (which serves as a registration agent for the ESP), and activates their fingerprint scanner device. At registration, each user provides their bibliographic information and designates the financial accounts to be used for transactions, including routing information. Each registered user is then provided with a SIID fingerprint scanner device 90, which they then activate. Activation entails scanning an initial fingerprint. A portion of the fingerprint image is digitized into "minutia" and that portion of the digitized fingerprint scan is stored locally on the device for later comparison. The same portion of the digitized fingerprint data is encrypted into a passcode with appended time-stamp. The encryption subdivides the fingerprint data portion into sub-portions, and cyphers each sub-portion into an alphanumeric code, the codes for each sub-portion being merged into one divisible passcode. This passcode is encrypted and stored on the device 90, along with the portion of the digitized fingerprint data for later comparison. A portion (such as, but not limited to one-half) the passcode called the "passkey" is encrypted and transmitted to a biometric registrar, SIID Database User Info 30, where it is stored in a remote database (hosted by the ESP) for later authentication. In addition, the encrypted passkey as well as designated account routing numbers are transmitted to a traffic controller 40 (another server maintained by the ESP). All data transmission is encrypted for security. The traffic controller 40 maintains a database cross-referencing each user passkey to their designated account routing information for each designated account. This way, once the Online Pass Network 20 routes a transaction, the traffic controller 40 is capable of directing the transaction details to the appropriate bank. The traffic controller 40 is also networked to the appropriate financial companies 61, banks 62 and credit card issuer 63 for effecting payment for authorized transactions. With activation complete, the user is now ready to complete transactions, including any and all credit and debit purchases of goods, services, as well as authentication of returns of goods, charge backs, etc.

After registration and activation, the user can (as at step 12) consummate any online transaction 52-56 simply by plugging their device (SIID) 90 into any computers USB port, or any other transaction terminal utilizing a USB port and or supported card readers at Point-of-Sale terminals, etc. The transaction can be authorized in a secure manner in seconds.

Figure 2:
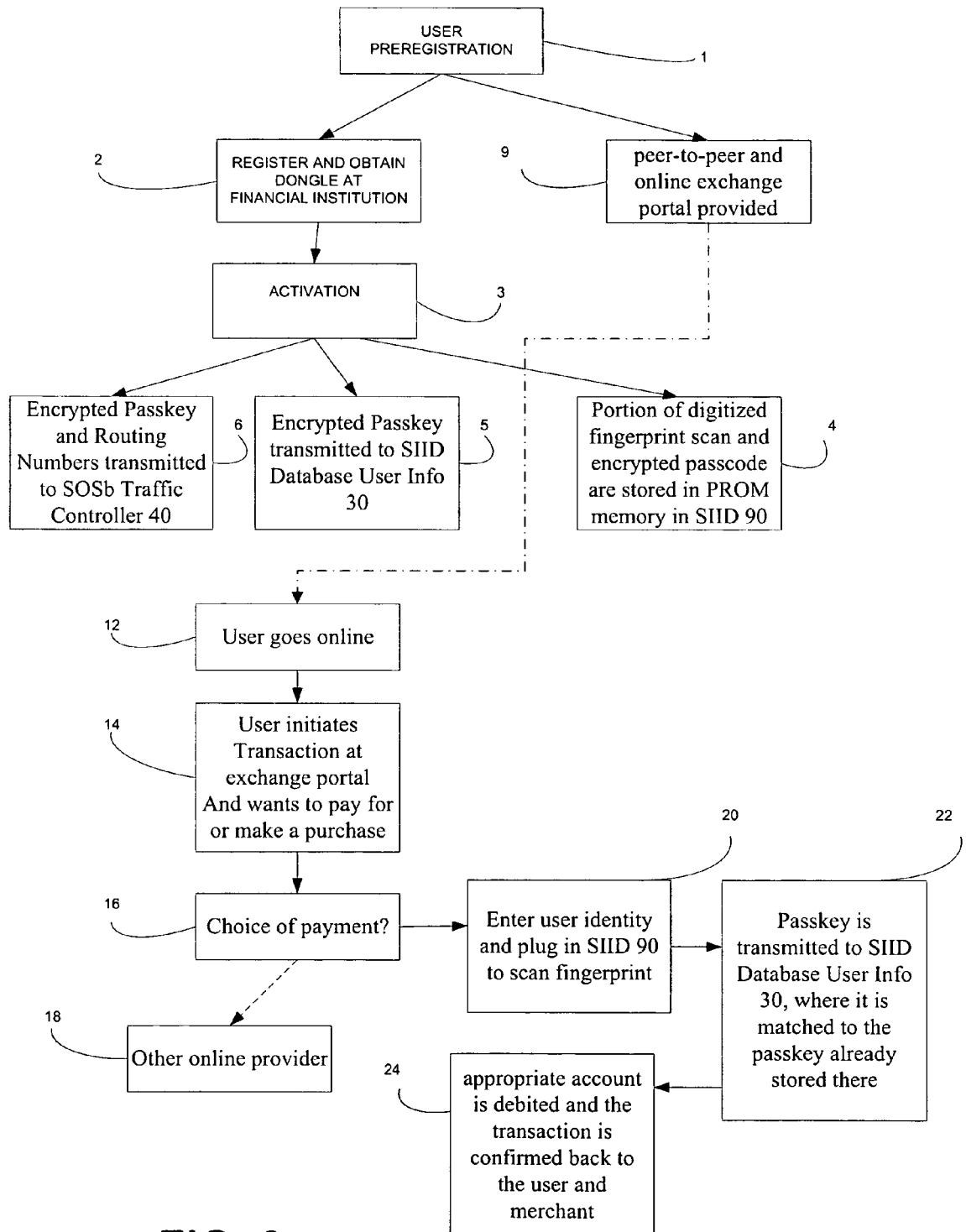
FIG. 2 is a block diagram illustrating a preferred embodiment of the method according to the present invention.

FIG. 2 is a top-level flow diagram illustrating the method steps of the present invention, which will now be described in detail with regard to FIGS. 1 and 2.

At step 1: (FIG. 3), users must first join the Online Pass network 20 and register themselves through participating and supported institutions. This is accomplished physically at any participating financial institutions 61, banks 62, credit issuers 63, etc., which essentially serve as a registration agents for the ESP service. At registration, each user provides their bibliographic information and designates the financial accounts to be used for transactions, including routing information.

The SIIDs 90, are useless until activated, and so at step 3 the user activates their device 90. Activation entails completing multiple "activation scans" of the user's finger or fingers. At the activation scan the fingerprints are scanned, and a portion of the digitized fingerprint data is stored locally on the SIID device 90 for later comparison. Also at step 4, the same portion of the digitized fingerprint data is encrypted into a passcode with appended time-stamp. The encryption subdivides the fingerprint data into sub-portions, and cyphers each sub-portion into an alphanumeric code, the codes for each sub-portion being merged into one divisible passcode. Thus, the passcode comprises a plurality of different fields each mapped to a section of the fingerprint, plus a designated time stamp. This mapping of fields means that the passcode is divisible, e.g., that the appropriate finger code corresponds to the appropriate finger, respectively. The time stamp is appended to the passcode.

At step 4 the passcode with the timestamp is encrypted and stored on SIID 90, along with the portion of fingerprint data for later matching reference. At step 5 the passcode is encrypted as explained above and a portion (such as, but not limited to one-half) the passcode (herein called the "passkey") is encrypted and transmitted to a biometric registrar, SIID Database User Info 30, where it is stored in a remote web-enabled database (hosted by the ESP) for later reference. At step 6, the passkey and the routing information for that user are sent from the registering bank or supporting institution to a traffic controller 40 (also a separate server hosted by the ESP) which serves as a transaction routing interface, routing each subsequent transaction to the bank or supporting institution hosting the designated account to be used for that transaction. Under this scheme, no party to the transaction possesses the fingerprint data, nor any portion of the fingerprint itself, and the user's privacy is maintained. The user is now ready to complete transactions.

Once registered and activated, the user is free to go online at step 12 and partake in online auctions 52, services 53, online banking 54, virtual shopping mall 55, or online bill payment facility 56, or any online portal or vendor participating with the Online Pass service provider, or may physically go to any other transaction site equipped with a USB port or supported card readers at point-of-sale terminals. The ESP hosts the auctions 52, services 53, online banking 54, virtual shopping mall 55, or online bill payment facility 56 and provides a multiple secure URL's at central 3rd party website 50 maintained on their network servers 20.

As an example, at step 14 the user finds an item to purchase or bill to pay and goes to checkout. This choice includes use of the Online Pass Network 20, or any other available online pay system to which the user is subscribed (step 18). The user makes their choice at step 16.

If, at step 18, the user chooses Online Pass, the Online Pass Network 20 issues an electronic prompt to the user to identify themselves, this requires the user to insert their device 90 into any USB port or supported card reader. This automatically initiates a scan of the users fingerprint.

Again, the device 90 reads the fingerprint minutia and matches it to the previously stored encrypted activation passcode/minutia that authenticates the user when successfully compared.

As before, at step 22 the passcode is encrypted and the same passkey is transmitted to the SIID Database User Info 30 for comparison to the earlier-stored passkey. The SIID Database User Info 30 confirms a match or non-match back to the Online Pass Network 20 and, if a match, authorizes the transaction to the Traffic Controller 40. As stated previously, traffic controller 40 maintains a routing database of users and the routing information of their designated financial accounts (encrypted codes for account information). Once the Online Pass Network 20 has approved the transaction, at step 24 the traffic controller 40 directs the transaction details to the appropriate bank or supporting institution 61-63, and the appropriate pre-designated user-account is debited and the transaction is confirmed back through the Online Pass Network 20 to the user and merchant. Confirmation (or declination) is signaled to the user by a yes or no confirmation screen (or in the case of point-of-sale purchases a merchant screen conveyed on to the user for yes or no confirmation). If the transaction is confirmed a green light authentication is sent to authorize the transaction.

The Online Pass online network provider charges the user a flat per-transaction fee which is paid in real time directly from the supporting institution upon consummation of the transaction. This low third party fee is justified due to the elimination of fraud expense. The net result is substantially secure transaction.

One skilled in the art will understand that the present method may be incorporated in any distributed architecture, over any type of communication backbone.

Figure 3:
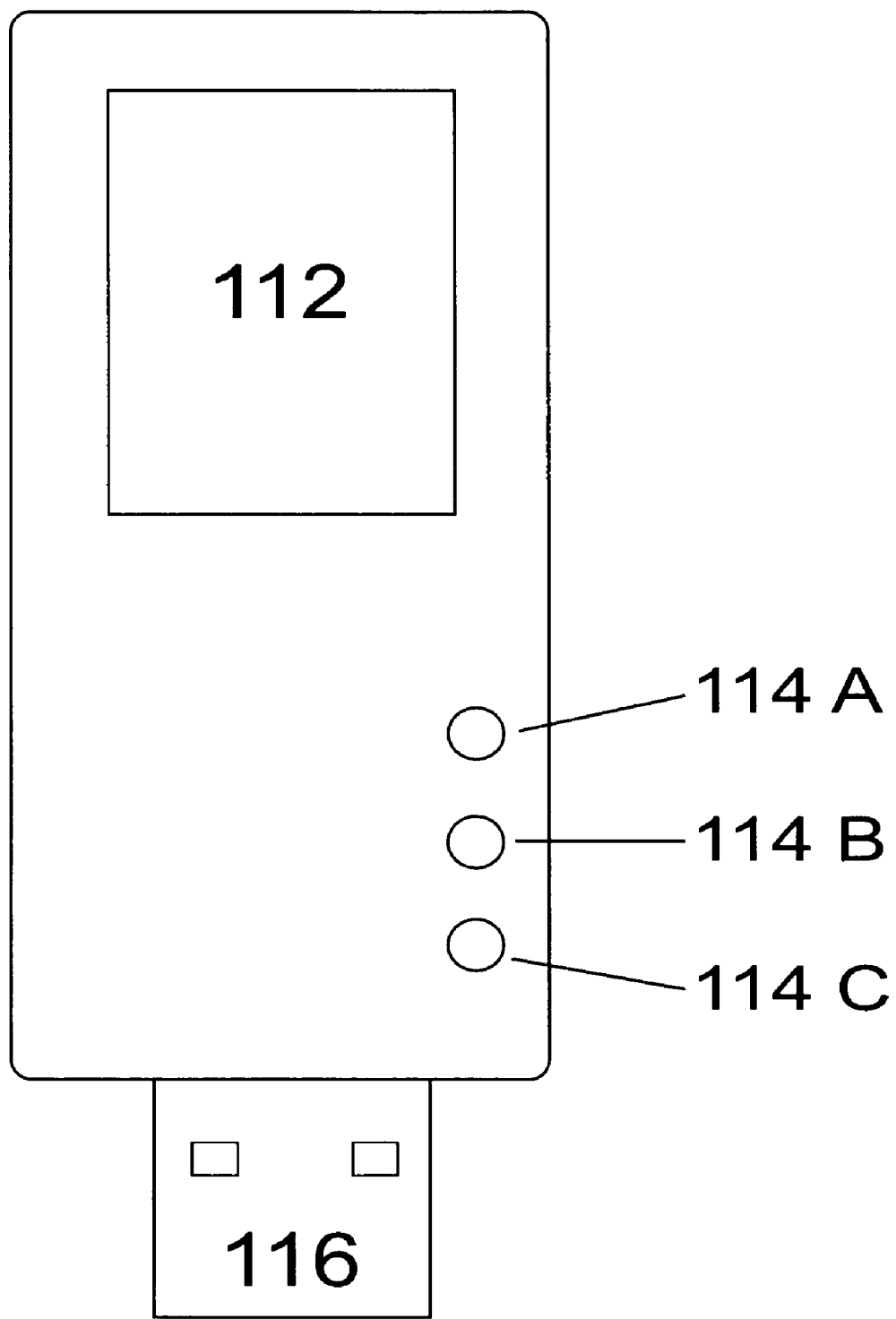
FIG. 3 is a drawing of the fingerprint scanning SIID 90 according to a preferred embodiment of the present invention.

FIG. 3 illustrates the USB dongle fingerprint SIID 90 according to the present invention. SIID 90 generally comprises a small plastic housing exposing the topside of a capacitive array sensor chip to form a fingerprint scanning bed 112, and three front-mounted LED indicators 114 for indicating "power on", and for indicating each fingerprint scan result "match" or "no match", respectively. SIID 90 encloses a processor for controlling the scanning operation and an amount of PROM memory for storing the activation information. Preferably 128 kB of PROM are used, the fingerprint accounting for about half this space. SIID 90 also includes a standard USB port connector 116 protruding from one end for insertion into any computer. Again, this SIID 90 becomes the user's personal key for authenticating each and every online or supporting portal transaction. Upon consummating an online transaction, the user simply plugs the USB port connector 116 into any computers or other supported USB device, and scans their own fingerprint. SIID 90 is programmed to process only a portion of the scan area and convert that scan data to a corresponding code based on distinguishing fingerprint characteristics lying within the apportioned scan area. The SIID 90 does not require the use of any external sensors, algorithms, template matches or database access. The capacitive array sensor chip is preferably a third generation capacitive array sensor chip that detects and captures small variations in the finger surface capacitance and creates a three-dimensional electrical image of the fingerprint's unique pattern. The SIID 90 detects placement of finger thereon, automatically scans, and at activation the unique features of the image are extracted to form its own encrypted template, which is then stored into protected memory in the SIID 90. Upon completion of the enrollment process, the SIID 90 becomes "locked" and subsequent placement of any enrolled finger on the sensor triggers the verification process. This involves comparing the previously stored "registered" template with the current finger, and authentication by a successful comparison of the subsets of "minutiae" from the live scan to those stored locally. The SIID 90 can also be programmed to permit an emergency response feature in the case of an unauthorized or unwanted attempt at use.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:

1. For authentication and enhanced security during online credit or debit transactions by a sponsor application service provider (ASP) hosting at least one network computer server, said sponsor ASP distributing a Secure Individual Identity Device to each of a plurality of users at banks or financial institutions, each said Secure Individual Identity Device comprising a portable biometric fingerprint scanner having internal memory and a USB port, an improved method comprising the steps of:

registering each of said plurality of users at one of said banks or financial institutions by the following substeps;

receiving bibliographic information and designated financial account information from each user to be used for user transactions, including designated routing data;

activating each Secure Individual Identity Device by scanning the fingerprints of the one of said plurality of users on said each Secure Individual Identity Device, digitizing said fingerprint minutia scan, and storing a portion of the digitized fingerprint scan locally in the memory of said each Secure Individual Identity Device, encrypting by said each Secure Individual Identity Device the stored portion of the digitized fingerprint scan into an encrypted alphanumeric passcode, and storing said passcode locally in the memory of said each Secure Individual Identity Device along with a time stamp, transmitting by said each Secure Individual Identity Device a encrypted passkey code to a remote biometric registrar database, said encrypted passkey code comprising a portion of said encrypted alphanumeric passcode, transmitting by said each Secure Individual Identity Device said encrypted passkey code to a remote traffic controller database cross-referencing each user passkey to a designated account routing data of the one of said plurality of users for each designated account;

one of said registered users consummating an electronic transaction by the following substeps, receiving a Secure Individual Identity Device of said one of said registered users into any computer USB port or supported card reader, receiving said registered user's finger on said Secure Individual Identity Device and automatically receiving a scan of the registered user's fingerprint, digitizing by said Secure Individual Identity Device a portion of the scanned fingerprint and translating said portion into a time-stamped encrypted passcode, storing said time-stamped encrypted passcode in said Secure Individual Identity Device.

* * * * *